Nov. 23, 1971 P. A. MACCHIONI 3,621,840
DEVICE FOR USE AS A REMEDY AGAINST MALE IMPOTENCE
Filed July 29, 1969
4 Sheets-Sheet 1
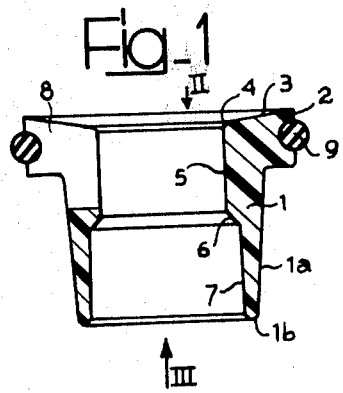
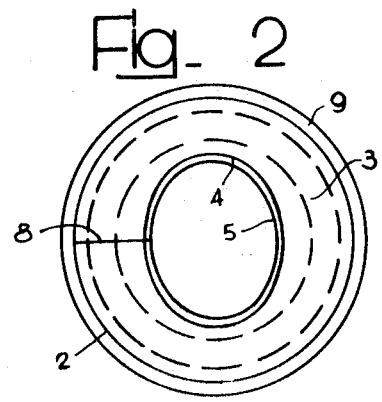
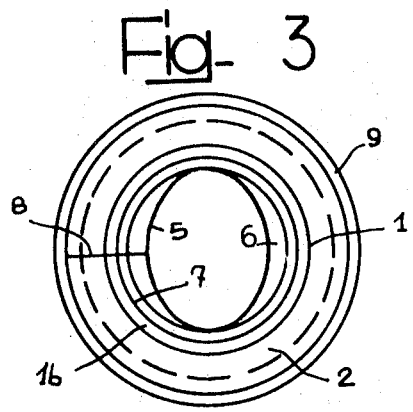
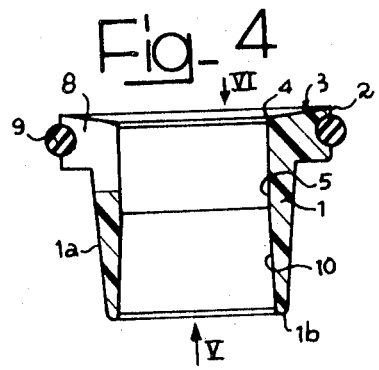
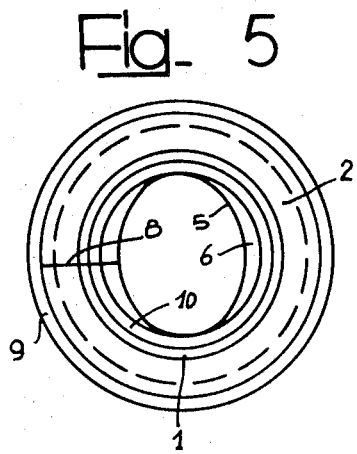
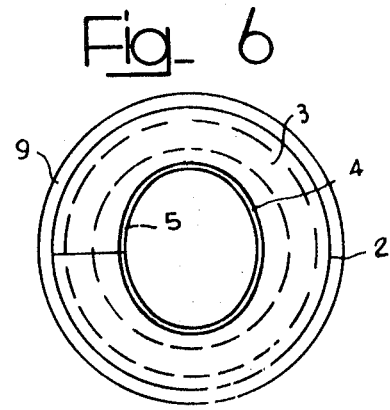

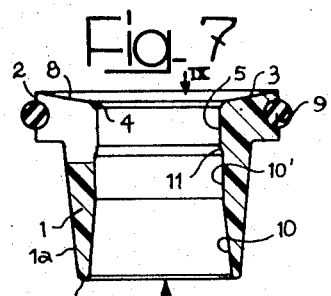
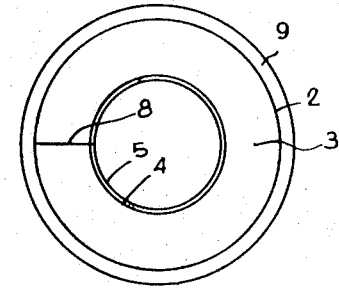
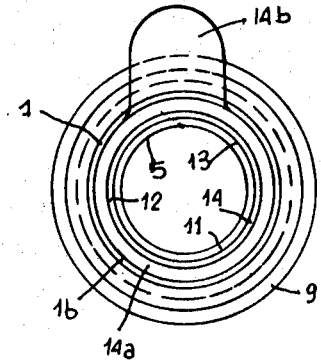
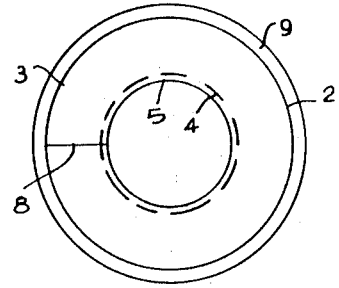
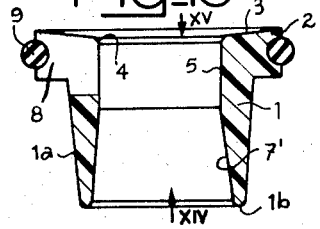

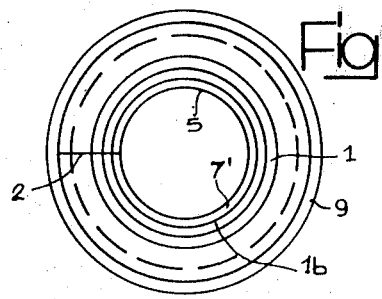
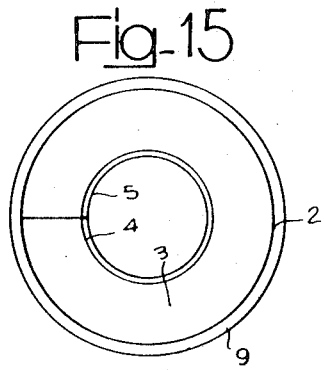
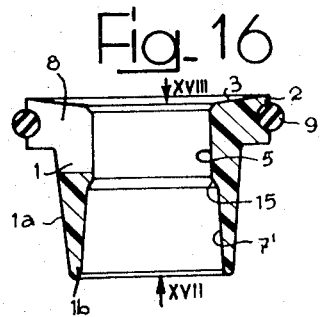
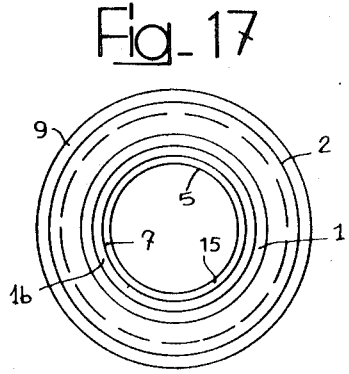
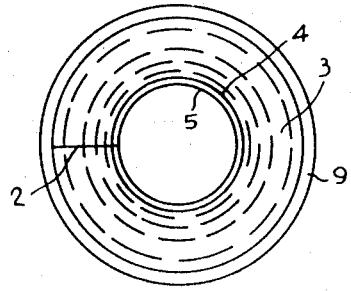
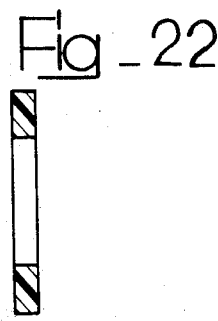

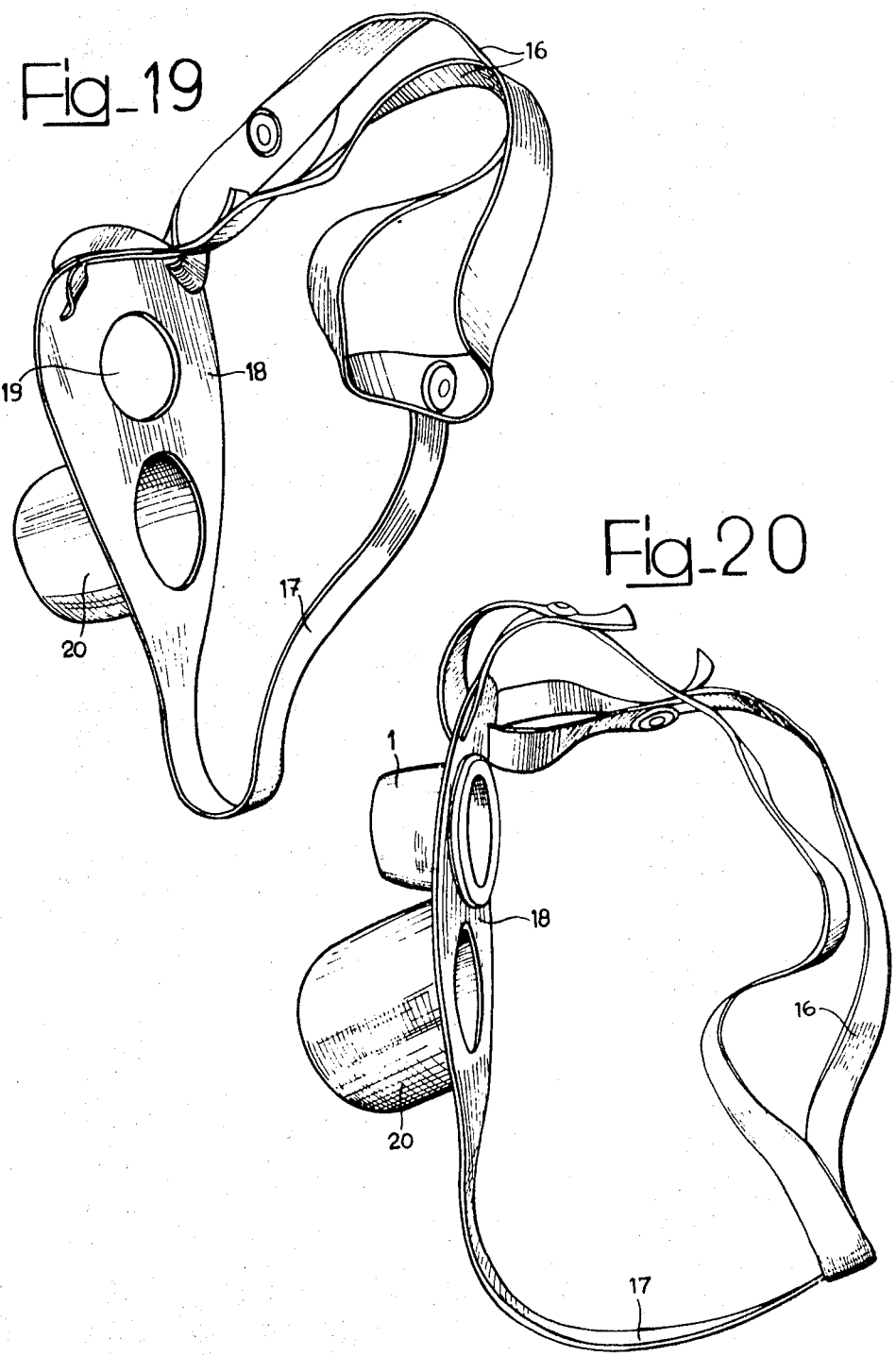

United States Patent Office 3,621,840
Patented Nov. 23, 1971

3,621,840
DEVICE FOR USE AS A REMEDY AGAINST
MALE IMPOTENCE
Pietro Aurelio Macchioni, Corso San Martino 8,
Turin, Italy
Filed July 29, 1969, Ser. No. 845,827
Claims priority, application Italy, July 29, 1968,
52,626/68
Int. Cl. A61f 5/00
U.S. Cl. 128—79                                    7 Claims

ABSTRACT OF THE DISCLOSURE

A device for use as a remedy against male impotence has a tubular elastic element which fits around the base of the penis of a user. The bore of the element has a diameter (or mean diameter if elliptical) corresponding to the mean diameter of the penis in a non-erect state, at least over a portion of the bore adjoining the end of the element which faces the body of the user.

---

This invention relates to devices for use as a remedy against male impotence.

An object of the invention is to provide a device able to counteract, at least to some extent, male impotence, of any origin, whether premature or senile.

According to this invention such a device is characterised in that the device comprises a tubular element made of elastic rigid or semi-rigid material the bore of which has, over at least a portion thereof adjacent a base end of the element which in use thereof faces the body of the user, a diameter or mean diameter which corresponds substantially to the mean diameter of the penis of the user at the base thereof when not in an erect state.

Conveniently the tubular element has at its base end an external flange. Preferably said flange and the said wall of the tubular element at least over said portion are provided with a through radial slit and the flange has an external annular peripheral groove in which is inserted an elastic ring, preferably of rubber, effective to maintain said slit normally closed.

The said bore of the tubular element may, according to a preferred embodiment of the invention, communicate, at said base end, with a bevelled end surface comprising two adjoining frusto-conical surfaces tapering away from said base end of the device, that is, towards the free end of the device.

Preferably the said bore has a part nearer to the free end of the tubular element, remote from the base end thereof, which has a larger diameter than the diameter or mean diameter of said portion of the bore. Said part of the bore with a larger diameter may be bounded by a cylindrical internal surface and in such case may be connected with the said portion of the bore through a short frusto-conical surface. Alternatively, said part with a larger diameter may be frusto-conical, tapering towards the base end of the device, that is to say, increasing in cross-sectional area towards the free end of the device opposite the base end thereof.

In a further alternative embodiment the said part of the bore with a larger diameter may be formed by two adjoining wall portions delimited by cylindrical surfaces interconnected by way of a frusto-conical surface.

The transverse cross-section of the said portion of the bore may be circular or elliptical for a given cross-sectional area. In the latter case the radial slit which in a preferred embodiment extends through said flange and the corresponding part of the wall of the tubular element is preferably situated in the plane containing the major axis of the elliptical cross-section.

The invention will be more particularly described, by way of example, with reference to the accompanying drawings, in which:

FIG. 1 is an axial section of the device according to one embodiment of the invention;

FIG. 2 is a view of one end of said device, taken in the direction of arrow II in FIG. 1;

FIG. 3 is a view of the device from the opposite end, taken in the direction of arrow III in FIG. 1;

FIGS. 4, 5 and 6; 7, 8 and 9; 10, 11 and 12; 13, 14 and 15; 16, 17 and 18 represent respective sections and end views, corresponding to those of FIGS. 1, 2 and 3 respectively of five alternative embodiments of the device according to the invention;

FIG. 19 is a perspective view of a support appliance adapted for use in combination with a device according to the invention;

FIG. 20 is a perspective view of the appliance of FIG. 19 with a device according to the invention incorporated therein;

FIG. 21 is a plan view of a calibre-ring used for determining the correct size for a device according to the invention, and FIG. 22 is a cross-section of said calibre-ring, taken on line XXII—XXII of FIG. 21.

In all the figures elements corresponding with one another in the different embodiments are designated by the same reference numbers.

Referring first to FIGS. 1 to 3, the device according to the invention comprises a tubular element 1 preferably made in elastic material, for example, transparent or coloured synthetic resin. The tubular element 1 can, however, also be made of a rigid or semirigid material of suitable quality.

The tubular element 1 is provided with a flange 2 at one of its ends, herein referred to as the base end. The axial length of the tubular element 1 can vary from 2 to 4 centimetres, while the axial extent of the flange 2 is of the order of 10 millimetres. The external surface 1a of the tubular element 1 is slightly frusto-conical in shape, tapering away from the base end. At the free end of the device, remote from the base end, the element 1 is provided with a rounded annular edge 1b, providing smooth interconnection between the external surface 1a and the internal surface of the bore of the tubular element 1. The edge 1b typically has a radius of 1 millimetre.

The bore of the tubular element 1 comprises, starting at the base end of said element, a bevelled end surface comprising a first, axially short frusto-conical surface 3 having a large inclination to the axis of the tubular element 1, and an adjoining second frusto-conical surface 4 which is of even shorter axial length than and is less inclined to the axis of the element 1 than the surface 3. There follows a bore portion 5 of uniform cross-sectional shape, the diameter or mean diameter of which is chosen to be substantially equal to the mean diameter, measured at the base, of the penis of the user, when not in an erect state. The following part of the bore comprises a frusto-conical surface 6 with an inclination opposite to that of the frusto-conical surfaces 4 and 3, followed by a cylindrical surface 7 which extends to the edge 1b at the free end of the device.

The flange 2 at the base end of the tubular element 1 has a radial slit 8 which extends over at least part of the remainder of the wall of the element 1, and which preferably, as illustrated, extends over at least the whole length of the portion 5 of the element 1. It is also contemplated that the slit 8 could extends the entire length of the tubular element.

On its outer surface the flange 2 is provided with an annular peripheral groove in which an elastic ring 9 is located. The ring 9, which is preferably of rubber, serves to maintain the slit 8 of the tubular element 1 normally closed.

The portion 5 of the bore of the tubular element 1 can have a cross-sectional shape which is circular or elliptical; where the bore portion 5 is elliptical in cross-section, it should have a cross-sectional area equal to that of the corresponding circular cross-section.

The embodiment illustrated in FIGS. 4 to 6 differs from that of FIGS. 1 to 3 in that the portion 5 of the bore of the tubular element 1, having a diameter or mean diameter as previously specified, is followed on the side remote from the base end of the element 1 by a slightly frusto-conical surface 10 with its larger end remote from the base end of the element 1, that is, adjoining the edge 1b.

The embodiment illustrated in FIGS. 7 to 9 differs from that according to FIGS. 4 to 6 in that between the frusto-conical surface 10 and the bore portion 5 there are interposed, in order, a cylindrical surface 10' with a diameter a little large than the diameter of the portion 5 (which in this embodiment is cylindrical) and a short frusto-conical interconnecting surface 11, having a greater inclination to the axis of the element 1 than that of the frusto-conical surface 10.

In the embodiment of FIGS. 10 to 12 the bore of the tubular element 1 between the edge 1b and the portion 5 includes, in order, cylindrical surfaces 12 and 13 respectively, interconnected by a frusto-conical surface 14 which tapers towards the base end of the element 1 so that its smaller end adjoins the cylindrical surface 13. The cylindrical surface 12 meets the edge 1b in a frusto-conical surface 14a forming an internal bevel at the free end of the tubular element. Such an internal bevel can be provided in the other devices illustrated in the drawings. Several (three in the embodiment illustrated in FIGS. 10 to 12) very elastic flexible projections 14b are provided externally on the tubular element 1 adjacent the base end of said element. The projections 14a, the number and shape of which can vary, are inclined to the axis of the tubular element 1 in a direction away from the base end thereof.

The embodiment illustrated in FIGS. 13 to 15 differs from that according to FIGS. 4 and 6 in respect of a greater inclination to the axis of the tubular element 1 of the frusto-conical surface 7' of the bore of tubular element 1 (which corresponds to the surface 7 in FIG. 1). In consequence of this, the surface 7' merges directly with the bore portion 5, and the intervening frusto-conical surface 6 (FIG. 1) is dispensed with.

Finally, the embodiment of FIGS. 16 to 18 differs from that of FIGS. 13 to 15 in that the frusto-conical surface 7' is connected with the bore portion 5 through an axially short frusto-conical surface 15 having an inclination to the axis of the tubular element 1 which is slightly greater than that of the frusto-conical surface 7'.

In all embodiments of the device according to the invention the tubular element 1 has, at or adjacent the base end, a bore portion 5 extending over an overall length of at least 15 millimetres with a constant diameter or mean diameter which corresponds substantially to the mean diameter measured at the base of the projecting part of the penis of the user, when it is not in an erect state.

Various tests have indicated that this condition is essential. The effect of the device in use can be compared to that of a strangulating or restricting valve which controls the flow of the blood from the penis in the direction of the body of the user.

The correct diameter or mean diameter of the bore portion 5 of the tubular element 1 can be established with the help of calibre-rings of the type shown in FIGS. 19 and 20. By using a series of such rings whose internal orifices have different diameters, one can establish the size of the bore portion 5 of the tubular element 1 which should be adopted by the user to get the hoped-for result.

The device according to the invention can be used with advantage in combination with a support appliance (FIGS. 21 and 22) including a belt 16 made preferably in plastics material. The belt 16 is secured to the end of a band 17, also of plastics material and is in use of the appliance applied to the waist of the user. The band 17 has an enlarged frontal web member 18 having a central opening 19 in which the tubular element 1 of one of the devices according to the invention as previously described can be inserted, with the flange 2 located behind the opening 19, as shown in FIG. 20.

Beneath the central opening 19 the frontal web member 18 is provided with an integral supporting container 20, so that the appliance acts as a suspensorium.

Electrical resistance heating elements may be incorporated in the wall of the supporting container 20, for connection to a low voltage current source by way of a thin connector cable (not shown). By heating the container 20 more advantageous conditions for the use of the device can be created.

It will be appreciated that details of the device according to the invention may be widely varied with respect to what has been described and illustrated by way of example, without departing from the scope of the present invention as defined in the appended claims.

I claim:

1. Device for use as a remedy against male impotence, comprising a tubular element of elastic material having at least some rigidity, said tubular element having an external flange provided with an external annular peripheral groove at the base end which in use of the device faces the body of the user, a bore portion adjacent said base end the cross-section of which corresponds substantially to the cross-section of the penis of the user at the base thereof when not in an erect state, said flange and the wall of said tubular element in the vicinity of said bore portion being provided with a through radial slit, and an elastic ring effective to maintain said slit normally closed.

2. Device as claimed in claim 1, including a bevelled end surface at the base end of the tubular element, communicating with the bore of said element, said bevelled end surface comprising two adjoining frusto-conical surfaces tapering away from the said base end.

3. Device as claimed in claim 1, wherein the tubular element has a bore part adjoining the free end of the element, remote from the base end thereof, which part has a larger cross-section than the cross section of said bore portion adjacent the base end.

4. Device as claimed in claim 3, wherein said bore part adjoining the free end of the element has a cylindrical internal surface.

5. Device as claimed in claim 3, wherein said bore part adjoining the free end of the element has a frusto-conical internal surface the larger end of which is remote from the base end of the element.

6. Device as claimed in claim 3, wherein said bore part adjoining the free end of the element consists of two juxtaposed cylindrical surfaces of different diameter, the larger diameter surface being the more remote from the base end of the tubular element, and a frusto-conical surface interconnecting said cylindrical surfaces.

7. Device as claimed in claim 1, wherein the transverse cross-section of the said bore portion of the tubular element is circular.

References Cited

UNITED STATES PATENTS

| | | | |
|---|---|---|---|
| 1,399,095 | 12/1921 | Webb | 128—79 UX |
| 1,608,806 | 11/1926 | Nelson | 128—79 |
| 3,455,301 | 7/1969 | Clark | 128—79 |

FOREIGN PATENTS

| | | |
|---|---|---|
| 87,819 | 3/1922 | Austria. |
| 260,938 | 6/1913 | Germany. |
| 23,165 | 1900 | Great Britain. |
| 413,258 | 5/1925 | Germany. |

OTHER REFERENCES 1,050,960 German printed application, February 1959, Beckmann.

LAWRENCE W. TRAPP, Primary Examiner

U.S. Cl. X.R.

128—61